(12) United States Patent
Ushiyama et al.

(10) Patent No.: US 8,085,638 B2
(45) Date of Patent: Dec. 27, 2011

(54) TEST-WRITE METHOD, INFORMATION RECORDING METHOD, AND INFORMATION RECORDING APPARATUS

(75) Inventors: Junko Ushiyama, Kokubunji (JP); Toshimichi Shintani, Kodaira (JP); Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/831,094

(22) Filed: Jul. 6, 2010

(65) Prior Publication Data
US 2010/0271917 A1 Oct. 28, 2010

(51) Int. Cl.
*G11B 7/00* (2006.01)
(52) U.S. Cl. ............ 369/59.12; 369/59.11; 369/47.53
(58) Field of Classification Search ........... 369/59.11, 369/59.12, 47.53, 53.27
See application file for complete search history.

(56) References Cited

U.S. PATENT DOCUMENTS

| | | | |
|---|---|---|---|
| 5,241,524 A | 8/1993 | Lee | |
| 5,303,217 A | 4/1994 | Bakx et al. | |
| 5,732,062 A | 3/1998 | Yokoi et al. | |
| 5,953,299 A | 9/1999 | Miyamoto | |
| 6,256,277 B1 | 7/2001 | Saga | |
| 6,404,716 B1 | 6/2002 | Saga et al. | |
| 6,456,579 B1 | 9/2002 | Miyamoto | |
| 6,737,996 B2 | 5/2004 | Kurokawa | |
| 6,876,611 B1 | 4/2005 | Adachi | |
| 6,996,052 B1 | 2/2006 | Mizuno et al. | |
| 7,095,692 B2 | 8/2006 | Shoji et al. | |
| 7,301,875 B2 | 11/2007 | Ichimura et al. | |
| 2001/0053115 A1 | 12/2001 | Nobukuni | |
| 2003/0012917 A1 | 1/2003 | Harigaya et al. | |
| 2003/0063542 A1 | 4/2003 | Ohno | |
| 2004/0130994 A1 | 7/2004 | Hellmig et al. | |
| 2006/0245336 A1 | 11/2006 | Yokoi et al. | |

FOREIGN PATENT DOCUMENTS

| | | |
|---|---|---|
| JP | 2003-030833 | 1/2003 |
| JP | 2005-149610 | 6/2005 |

OTHER PUBLICATIONS

The Phase-Change Optical Disc with the Data Recording Rate of 216 Mbps, Shingai et al., Optical Data Storage 2003, SPIE, vol. 5069 (2003).
High Speed Rewritable DVD up to 20m/s with Nucleation-Free Eutectic Phase Change Material of Ge(Sb70Te30)+Sb, Horie et al., Optical Data Storage 2000, SPIE vol. 4090 (2000).

*Primary Examiner* — Adam R Giesy
(74) *Attorney, Agent, or Firm* — Antonelli, Terry, Stout & Kraus, LLP.

(57) ABSTRACT

A test-write method for accurately and quickly determining recording conditions, and an apparatus suitable therefor. In a 2T-based strategy, recording pulse conditions are determined by separately test-writing an even-number length mark and an odd-number length mark, and then the relative positions of the even-number length mark and the odd-number length mark at the recording pulse start time are adjusted.

6 Claims, 13 Drawing Sheets

TEST-WRITE REGION FOR
ODD-NUMBER LENGTH PATTERN

TEST-WRITE REGION FOR
EVEN-NUMBER LENGTH PATTERN

TEST-WRITE METHOD, INFORMATION RECORDING METHOD, AND INFORMATION RECORDING APPARATUS

CLAIM OF PRIORITY

The present application claims priority from U.S. patent application Ser. No. 10/931,040, filed Sep. 1, 2004, which claims priority from Japanese application JP 2004-222742 filed on Jul. 30, 2004, the content of which is hereby incorporated by reference into this application.

BACKGROUND OF THE INVENTION

1. Field of the Invention

The present invention relates to a test-write method, and an information recording method and apparatus for recording information by injecting energy into a recording medium to form a mark different from an unrecorded portion.

2. Background Art

Test writes are performed in order to record information on an optical disc with high accuracy. A test write refers to the operation of determining optimal recording parameters depending on the immediate ambient temperature and the characteristics of the laser mounted on a drive so that a recording mark with better quality can be formed. In optical discs such as DVD-RW, DVD+RW, and BD-RE, a material with a so-called eutectic composition is used in the recording film. In the currently commercially available recording apparatuses, when performing a test write in the aforementioned optical discs, the recording conditions written in the optical disc beforehand are read out and then the laser power is adjusted. The recording conditions include laser power set values, such as a recording power level (Pw) which is of high laser power, an erasing power level (Pe) which is of intermediate power, and a bias power level (Pb). The recording conditions further include various pulse widths of pulses forming a multi-pulse waveform, including a first pulse, a plurality of subsequent intermediate pulses, and a last pulse.

In an actual test write, a technique is used whereby, based on these recording conditions, the ratio of Pw and Pe that are written in the optical disc in advance is fixed, and the optimum recording conditions are determined using the laser power as a parameter. This method is called an Optimum Power Control (OPC). In relatively slow-speed recordings, such as BD 1× speed or DVD-RW 2.4× speed, good recording quality could be obtained by performing a test write by varying only the laser power with a constant Pw/Pe ratio.

Research and development of high-speed recording and reproduction technology for the aforementioned optical discs are progressing. For example, in Optical Data Storage 2003, Proceedings of SPIE Vol. 5069 (2003), p. 130 (Non-Patent Document 1), there is described a recording technique involving a recording speed of 216 Mbps, which corresponds to BD 6× speed. As the recording speed increases, there has also been an advance in the study of recording waveforms suitable for higher speeds, or the so-called 2T-based strategy. The 2T-based strategy involves a recording waveform such that the number of recording pulses is the same for an adjacent pair of even-number length mark and odd-number length mark. For example, as shown in FIG. 2, in a case where a minimum mark length is 2T, a single pulse is generated for a 2T mark and a 3T mark, and two pulses consisting of a first pulse and a last pulse are generated for a 4T mark and a 5T mark. For a 6T mark and a 7T mark, a total of three pulses, namely a first pulse, one intermediate pulse, and a last pulse, are generated.

An example of the 2T-based strategy is disclosed in JP Patent Publication (Kokai) No. 9-134525 A (1997) (corresponding to U.S. Pat. No. 5,732,062; Patent Document 1). The example relates to a multi-pulse recording method using a first pulse, a plurality of subsequent intermediate pulses, and a last pulse, wherein, when recording either an even-number length mark or an odd-number length mark relative to a recording channel clock period, the pulse width of the first pulse and that of the last pulse are made substantially equal to the recording channel clock period.

In another example, JP Patent Publication (Kokai) No. 11-175976 A (1999) (corresponding to U.S. Pat. No. 6,256,277; Patent Document 2) discloses a technique using a recording waveform such that a minimum pulse width in the multiple pulses is set to be larger than one half the window margin. By so doing, the publication reads, a sufficient cooling time for the recording medium can be ensured and the frequency component in the laser drive current can be reduced, so that marks can be formed with sufficient accuracy even at high transfer speeds.

JP Patent Publication (Kokai) No. 2003-30833 A (Patent Document 3) discloses a recording technique whereby not only is the period of intermediate pulse strings made longer than the recording channel clock period, as in JP Patent Publication (Kokai) No. 11-175976 A (1999), but also the edge position of the first pulse and that of the last pulse are varied depending on a preceding space or a subsequent space. The publication states that this method can minimize the edge shift due to thermal interference in a track direction, which poses a problem in a high-density and high-transfer rate recording, and allows a high-accuracy recording control to be realized.

JP Patent Publication (Kokai) No. 2001-331936 A (corresponding to U.S. 2001/053115 A1; Patent Document 4) discloses that the reference clock is displaced for an even-number code sequence and an odd-number code sequence, and that, for even-number and odd-number recording pulse waveforms, the duty ratio of the first pulse and the last pulse is changed between even numbers and odd numbers.

The recording mark-shape controlling effect of the 2T-based strategy in high-transfer rate recording is described in Optical Data Storage 2000, Proceedings of SPIE Vol. 4090 (2000), p. 135 (Non-Patent Document 2), for example.

[Patent Document 1] JP Patent Publication (Kokai) No. 9-134525 A (1997)

[Patent Document 2] JP Patent Publication (Kokai) No. 11-175976 A (1999)

[Patent Document 3] JP Patent Publication (Kokai) No. 2003-30833 A

[Patent Document 4] JP Patent Publication (Kokai) No. 2001-331936 A

[Non-Patent Publication 1] Optical Data Storage 2003, Proceedings of SPIE Vol. 5069 (2003), p. 130

[Non-Patent Publication 2] Optical Data Storage 2000, Proceedings of SPIE Vol. 4090 (2000), p. 135

SUMMARY OF THE INVENTION

In the above-described test write method according to the conventional art, or the OPC method, best-quality recording conditions are determined by optimizing the laser power with Pw/Pe kept constant. However, the inventors' analysis has shown that if recording speeds of BD 4× or DVD±RW 8× or higher are to be achieved, it is difficult to obtain a good mark quality with the OPC method, in which the laser power with a fixed Pw/Pe is used as the parameter. This is due to the following reasons. In cases of low-speed recording, such as BD 1× and DVD±RW 2.4×, there is sufficient time between the irradiation of the aforementioned first pulse and the irradiation of the next pulse (intermediate or last pulse) that the recording film can be sufficiently cooled before the next pulse irradiation. However, in cases of high-speed recording, the time between the irradiation of the first pulse and the irradiation of the last pulse is reduced such that the cooling speed of the recording film would be relatively insufficient, leading to the problem that the leading edge formed by the first pulse cannot be sufficiently cooled. If the next pulse is irradiated when the leading edge is not sufficiently cooled, crystallization occurs in the leading edge portion, which leads to edge fluctuation or edge shift. This is equivalent to a deterioration of mark quality. Thus, there is the problem that the recording performance is adversely affected by an increase in speed.

Moreover, as the recording speed increases, the individual variation in the characteristics of the laser mounted in commercially available drives cannot be disregarded. For example, the recording channel clock period T at BD 4× speed is approximately 3.8 ns, and the laser waveform must be controlled below 1 ns. However, since the rise and fall time of current lasers are on the order of 1 to 2 ns, the waveform control on the order of 1 ns is close to physical limits, where the individual differences in the rise and fall of the laser come to significantly affect the shape of a recording mark. Further, the problems of individual differences in apparatuses that could be absorbed by the medium in the case of low-speed recording, such as the difference in emission waveforms between different drives due to drive-to-drive variations in the spot size, come to the fore in high-speed recording.

The invention has the following features.

(1) Mark lengths in a recording code sequence are classified into recording patterns according to the remainder when, with regard to marks of lengths that are n times the window margin, where n is a natural number, n is divided by an integer constant of 2 or larger. The resultant recording patterns are recorded and then reproduced, and based on the result of reproduction, an optimum recording pulse waveform is set. In this way, the pulse adjusting amount can be made constant for each of the recording patterns classified according to the remainder, so that an optimum pulse adapted for high speed can be efficiently obtained.

For example, in the case of the 2T-based strategy, an even-number length recording pattern composed of recording marks with a length corresponding to an even-number multiple of the reference clock period, and an odd-number length recording pattern composed of recording marks with a length corresponding to an odd-number multiple are respectively recorded and then reproduced. Based on the result of the reproduction, an even-number length optimum recording pulse waveform and an odd-number length optimum recording pulse waveform are set. In other words, in the case where the temporal length of a single recording mark is nT (where T is the reference clock period, n is a natural number of 2 or larger), when forming a recording waveform for test write using a recording laser beam consisting of a number L of pulses, the recording patterns consist of (A) an even-number length recording pattern formed by marks nT=2LT, namely recording marks with a length corresponding to an even-number multiple of the reference clock period, and (B) an odd-number length recording pattern formed by marks nT=(2L+1)T, namely recording marks with a length corresponding to an odd-number multiple. The even-number length recording pattern (A) and the odd-number length recording pattern (B) are recorded and then reproduced. Based on the result of the reproduction, an optimum recording pulse waveform is set on the basis of the thus determined even-number length recording pulse waveform and the odd-number length recording pulse waveform.

In the case of a 3T-based strategy, where nT=3LT, a recording pattern (A) formed by marks with nT=3LT, a recording pattern (B) formed by marks with nT=(3L−2)T, and a recording pattern (C) formed by marks with nT=(3L−1)T are recorded. Then, an optimum recording pulse waveform is determined based on the resultant three sets of recording pulse waveforms.

In the case of a 4T-based strategy, where nT=3LT, a recording pattern (A) formed by marks with nT=4LT, a recording pattern (B) formed by marks with nT=(4L−2)T, a recording pattern (C) formed by marks with nT=(4L−1)T, and a recording pattern (D) formed by marks with nT=(4L+1)T are recorded. Then, an optimum recording pulse waveform is determined based on the resultant four sets of recording pulse waveforms.

(2) With regard to the setting of the optimum pulse waveform, an optimum recording pulse waveform is set by adjusting the relative positional relationship between the first-pulse irradiation start positions of the recording pulse waveforms classified by the remainder. In this way, an optimum recording waveform can be obtained by a simple configuration.

(3) It is possible to absorb the variations in the rise and fall of laser in the individual apparatuses or spot shape differences in each apparatus by making Pw and Pe independently variable rather than using the laser power with constant Pw/Pe as the parameter for test write and by making the pulse width and the pulse start position variable. By employing such parameters, an emission waveform can be set by taking into consideration the cooling time of the medium, so that the edge fluctuation and edge shift can be minimized. These parameters may all be changed during a test write. Alternatively, some parameters may be fixed and others may be changed so as to obtain an optimum waveform.

In the case of the 2T-based strategy, it is effective to carry out a test write separately for the even-number length mark and the odd-number length mark.

These methods are effective not only with optical discs of the type that has a single recording film layer but also with optical discs with a plurality of recording film layers. For example, in the case of an optical disc with two recording layers, there is the problem that the recording margin in each recording layer becomes narrower than that in the case of a disc with a single recording layer. However, in accordance with the invention, the recording margin can be enlarged by individually setting the recording power Pw and the erasing power Pe and making the pulse width variable, in addition to only controlling the laser power.

These measures are particularly effective when performing a test write in rewritable media that employ an eutectic recording film, such as DVD-RW, DVD+RW, and BD-RE.

By performing such a test write, it may in some cases take more time than by the conventional art. However, in media for which the term "burn" is used to refer to recording, such as DVD±RW and BD-RE, the time it takes for a test write is 2 to 3 seconds, while it takes far longer time (such as 10 minutes) to "burn" (record). Thus, even if the time for a test write increased by five times, there would be not much change in the duration of time in which the user must be kept waiting, so that the usability of the optical disc does not become any worse and no disadvantages are caused to the user.

In accordance with the invention, the accuracy of a test write can be increased, so that an optical disc with a higher recording quality that is adapted for high speed can be provided.

DESCRIPTION OF THE PREFERRED EMBODIMENTS

Figure 1:
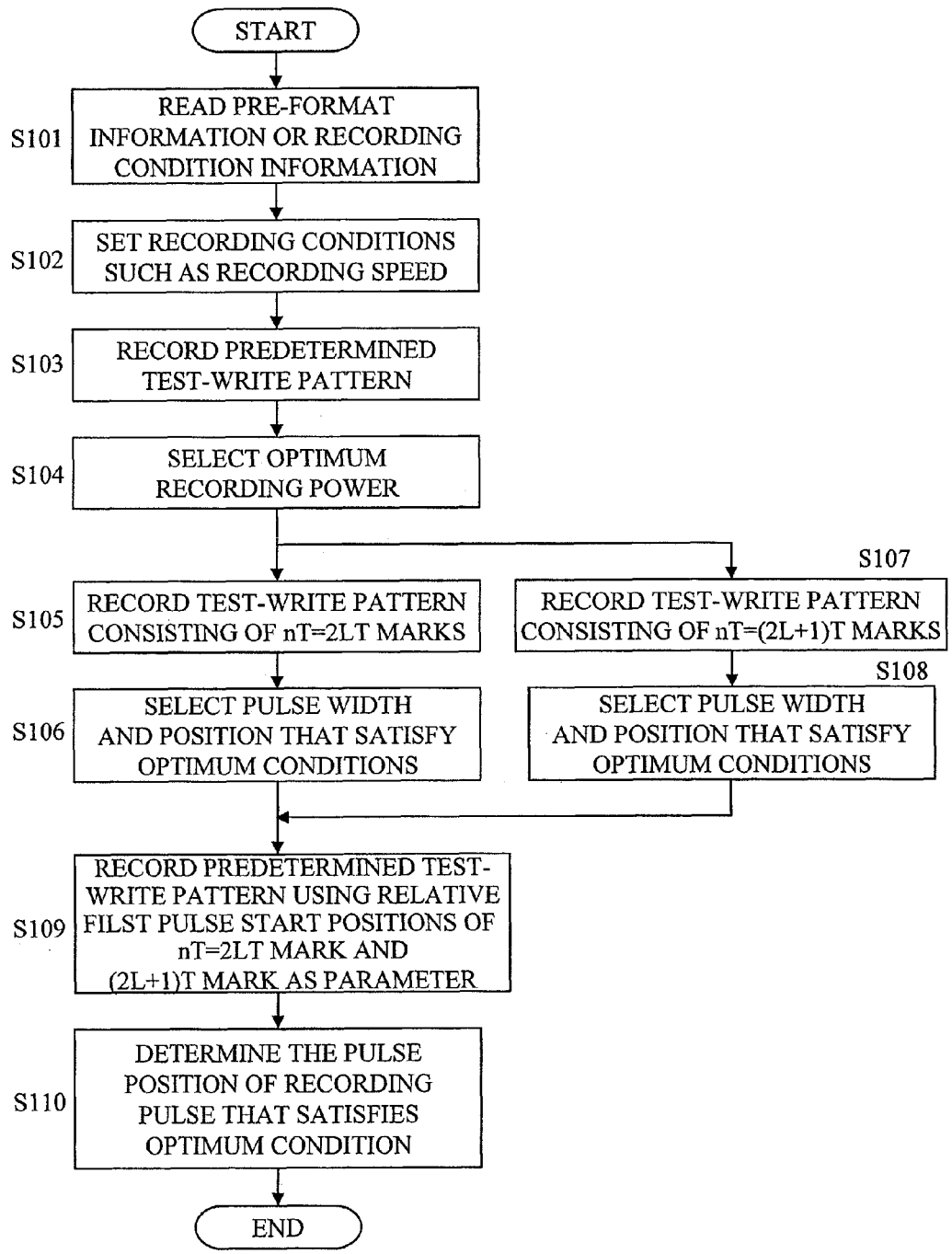
FIG. 1 shows a process flowchart of a test-write method according to an embodiment of the invention.

Embodiments of the invention will be described by referring to the drawings.

Embodiment 1

Figure 3:
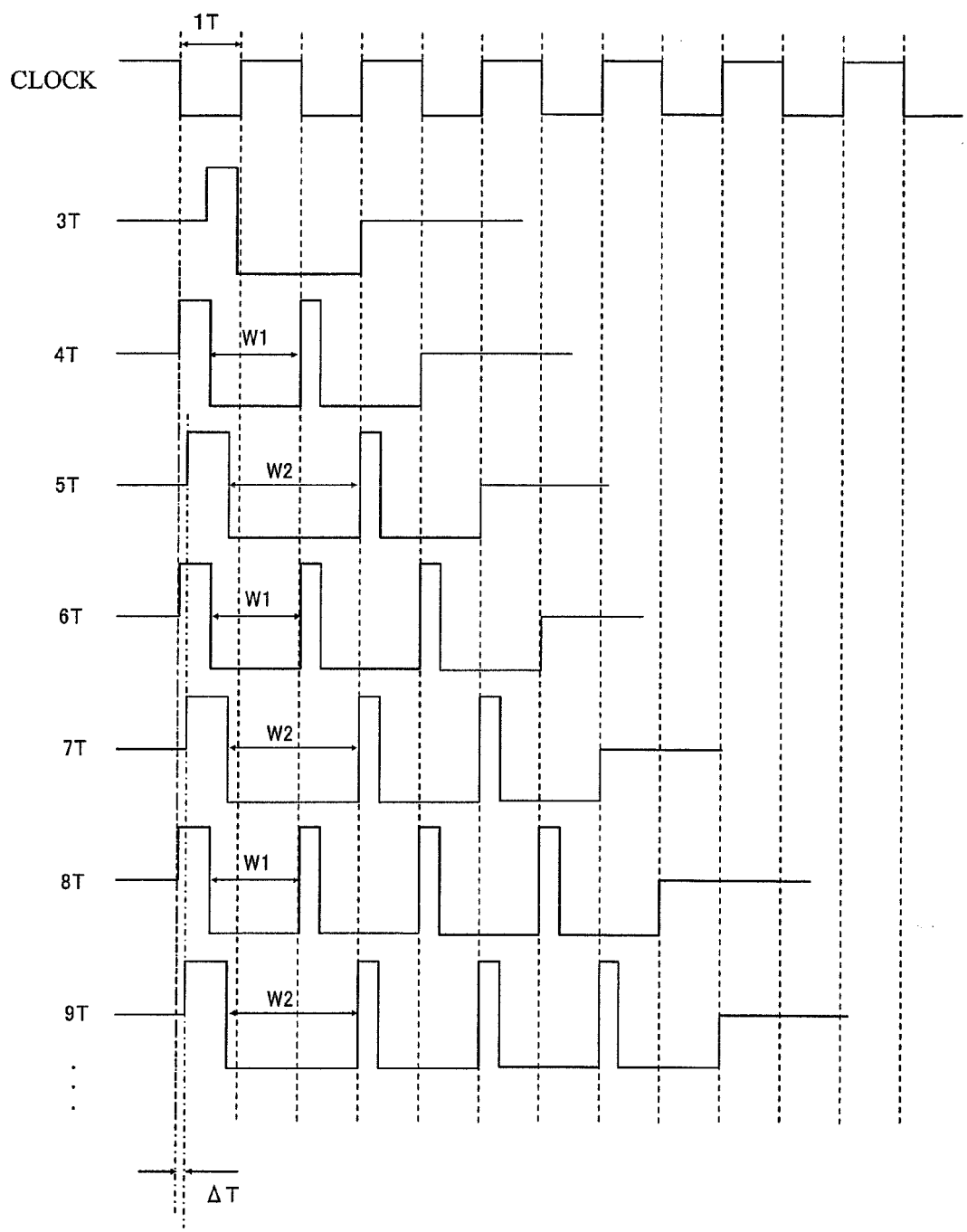
FIG. 3 shows an example of a recording pulse waveform used in the invention.

First, the recording method used in the present embodiment will be described. When writing data on an optical disc, a mark-edge recording method employing multiple pulses is used, whereby the data is written in the disc in terms of length information about marks and spaces. The modulation method employed was such that the length of a mark and a space was a combination of integer values 3T to 14T. FIG. 3 shows an example of the recording waveform used in the present invention. In the present embodiment, the 2T-based strategy was employed. A 3T mark is formed by a single pulse, and a 4T mark and a 5T mark are formed by two pulses, namely a first pulse and a last pulse. A 6T mark and a 7T mark are formed by a total of three pulses, namely a first pulse, a last pulse, and a single intermediate pulse. An 8T mark and a 9T mark are formed by a total of four recording pulses, namely a first pulse, a last pulse, and two intermediate pulses. Thereafter, the number of intermediate pulses increases as the mark length increases. When a recording mark is nT (where T is a reference clock period, and n is a natural number of 2 or larger), even-number length marks such as 4T and 6T marks can be expressed by nT=2LT, while odd-number length marks such as 3T and 5T marks can be expressed by nT=(2L+1)T, where L is a natural number and indicates the number of recording pulses.

The disc employed was a rewritable DVD (a red light-source adapted phase-change disc) capable of 12× speed recording, with a linear velocity of approximately 41.9 m/s. The clock period T in FIG. 3 is about 3.2 ns.

The invention is described with reference to FIG. 1 showing a flowchart of the operation of the test write method according to the present embodiment. In a first step (S101), the recording conditions recorded on the disc, such as a recommended recording power and pulse width, were read, obtaining a recording power (Pw) of 130 mW, an erasing power (Pe) of 6 mW, and a bias power (Pb) of 0.5 mW. In a second step (S102), laser power conditions were set in these vicinities. In a third step (S103), a test write was carried out on the disc. The laser power conditions were such that the value of Pb was fixed, Pw/Pe was not a fixed value, and Pw was varied between 116 mW and 144 mW in increments of 2 mW, and Pe was varied between 5.5 mW and 6.5 mW in increments of 0.5 mW. As a result of the test write in the third step (S103), a minimum jitter of 6.2% was obtained when Pw was 134 mW and Pe was 6 mW, in a fourth step (S104). Preferably, the test-write recording pattern used in the third step for obtaining the optimum recording power should not be a so-called random signal in which all of the mark lengths and space lengths are variously combined. In the case of a high-speed recording, if a random signal is recorded without optimizing the recording waveform such as the recording pulse width, the jitter would not decrease in some cases even near the supposedly optimum recording power. This is due to the fact that the recording is carried out using an inappropriate recording waveform and, as a result, the problem occurs that a laser power that should have been an optimum power cannot be selected. For this reason, the test-write recording pattern used in the third step should preferably be a simple recording pattern that would not produce mark-to-mark thermal interference, such as one consisting of a repetition of the same marks and spaces, or one using several kinds of marks and a long space.

Using the optimum recording power selected in the fourth step, a recording was carried out in a fifth and a sixth step (S105 and S106) in order to determine the optimum conditions regarding the recording pulse width of the recording mark and the start position of the recording pulse. In this case, it is important to carry out the recording using a test-write pattern consisting only of even-number length marks and a test-write recording pattern consisting only of odd-number length marks, as shown in FIG. 1. In the present embodiment, in the even-number length mark test-write pattern, six kinds of even-number length marks, namely 4T, 6T, 8T, 10T, 12T, and 14T, and 12 kinds of lengths of spaces, namely 3T to 14T, are randomly disposed. Similarly, in the odd-number length mark test-write pattern, six kinds of odd-number length marks 3T, 5T, 7T, 9T, 11T, and 13T, and 12 kinds of lengths of spaces 3T to 14T are disposed in a random manner. In the present example, the space lengths in these recording patterns include mixtures of even-number lengths and odd-number lengths. With regard to the space length, there is no need to provide such limitations as providing only even-number length spaces in an even-number length test-write pattern.

In the 2T-based strategy, the number of recording pulses in an even-number length mark and that in an odd-number length mark in an adjoining pair are the same. For example, as shown in FIG. 3, a 4T mark and a 5T mark are each made up of two recording pulses, and a 6T mark and a 7T mark are made up of three recording pulses. What is unique here is that the Pb-level pulse width (W1) after the irradiation of the first pulse of the 4T mark is substantially the same as that (W1) of the 6T mark. Similarly, the Pb-level pulse width (W2) after the irradiation of the first pulse of the 5T mark is substantially the same as that (W2) of the 7T mark. The front edge position of a recording mark formed by a first pulse is influenced by the start position of the recording pulse that comes after the first pulse. For example, as the recording pulse that comes after a first pulse is located increasingly away from the first pulse, there would be less region that is recrystallized after the melting of the recording film. As a result, there would be not much shrinkage of the front edge position, so that the front edge position would be fixed at a position closer to the front edge of the molten region. Conversely, as the recording pulse that comes after the first pulse is located closer to the first pulse, there would be more region that is recrystallized after the melting of the recording film. As a result, there would be much shrinkage in the front edge position, such that the front edge position would be fixed further behind the molten region.

Figure 2:
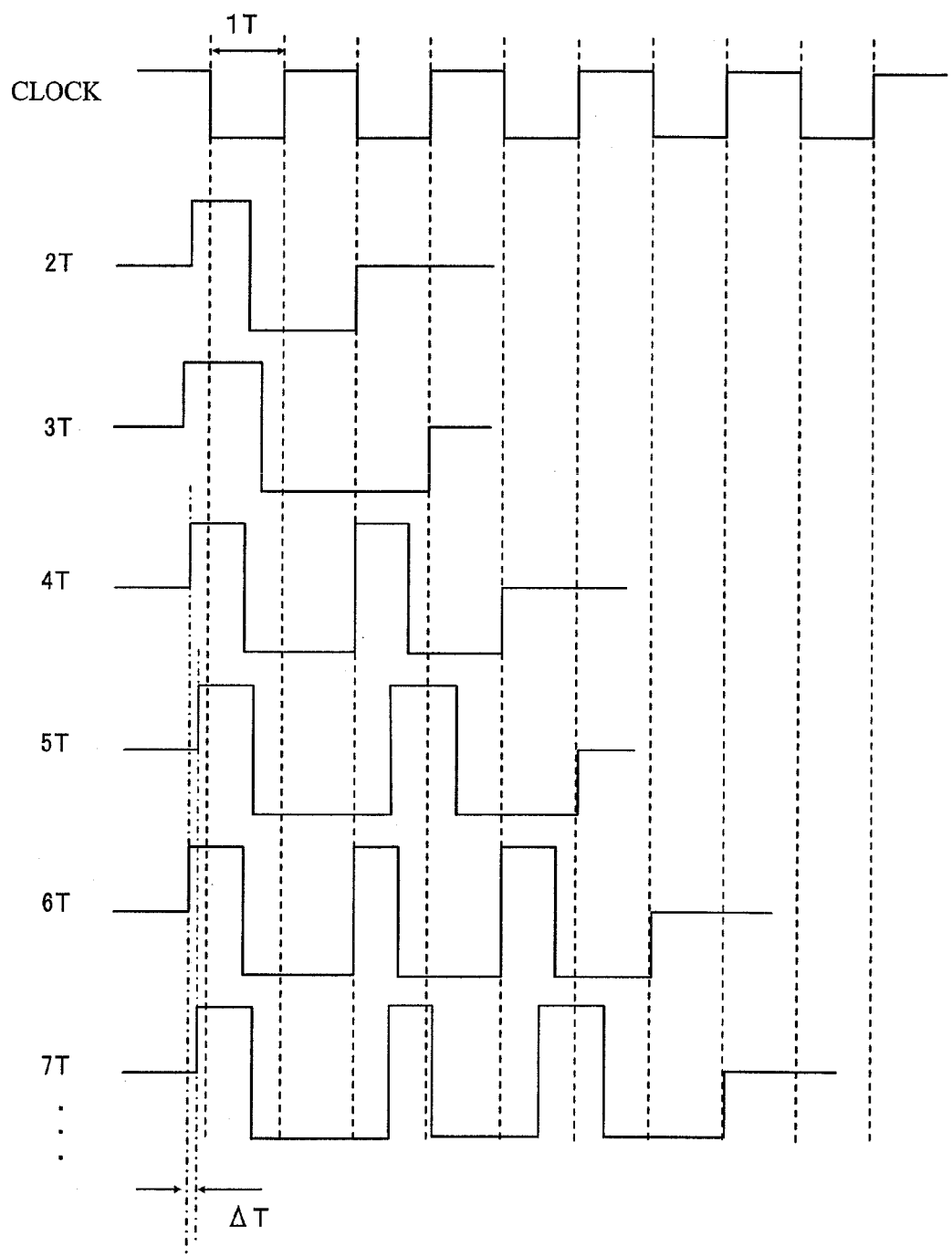
FIG. 2 shows an example of a recording pulse waveform used in the invention.

The influence of the irradiation of the recording pulse that comes after the first pulse (an intermediate pulse or a last pulse) on the front edge position is thought to be substantially the same between the 4T mark and 6T mark, and between the 5T mark and 7T mark. As shown in FIG. 3 (not shown in FIG. 2), an 8T mark has a front edge position that is similar to that in a 4T and a 6T mark. By utilizing a test-write recording pattern consisting only of marks with such similar thermal characteristics, the increase in jitter due to the fluctuation of the edge position caused by multiple kinds of recording pulse shapes can be made less visible, so that an optimum recording pulse width can be determined accurately and efficiently.

Using the recording waveform of each recording mark that is set with the pulse width and position of a recording pulse that satisfy the optimum conditions determined in the seventh and eight steps (S107 and S108), a test write was carried out in a ninth step (S109). Specifically, using the relative positions of the first pulse start position of the even-number length mark and that of the odd-number length mark determined in steps S107 and S108 as a parameter, ΔT shown in FIG. 3 was determined. As a result of the test write in the ninth step (S109), an optimum ΔT of 0.07 Tw and an optimum jitter of 6.4% were obtained in a tenth step (S110).

While the intermediate pulse width in the present embodiment was the same for both the even-number length mark and the odd-number length mark, yet better recording conditions may be obtained by setting the width of the intermediate pulse or its duty variously individually.

In the present embodiment, with regard to the 3T mark formed by a single pulse, the recording pulse conditions including the first pulse position were independently set. This is due to the fact that the 3T mark is made up of a single pulse and therefore the process of determining the front edge position is different from that of the other marks made up of a plurality of recording pulses. In the present embodiment, the recording pulse conditions for the 3T mark were determined in step S109 of a test write, as well as determining ΔT in the tenth step (S110).

While in the present embodiment the number of recording pulses of nT=2LT and nT=(2L+1)T are equal such that the 4T mark and the 5T mark have the same number of recording pulses, the same effects of the invention can be obtained when the recording pulses for nT=2LT and nT=(2L−1)T are equal such that the number of pulses is the same for 5T and 6T.

Further, in the present embodiment, a test write was carried out by using the start position of the first pulse of each recording mark as an individual parameter. Specifically, the start position and pulse width of the first pulse, the start position and pulse width of the intermediate pulse sequence, and the start position and pulse width of the last pulse of each mark were determined. As a result, as shown in FIG. 3, the start position of the first pulse relative to the clock was the same between even-number length marks of lengths of 4T mark or more, and so was the start position of the first pulse between odd-number length marks of lengths of 5T mark or more. Thus, the optimum start position of the first pulse in some cases turn out to be the same between even-number length marks and between odd-number length marks. Therefore, in a test write on an actual production-model drive, by setting the start position of the first pulse to be the same beforehand in each test-write recording pattern used in steps S105 and S106, the time required for the test write can be reduced and the area that is required for the test write can be reduced.

While in the present embodiment the jitter was used as the factor for the evaluation of reproduction characteristics, the same effects of the invention can be obtained even when the type of the evaluation factor is changed. For example, PRML may be used for the evaluation of reproduction performance.

Furthermore, while in the present embodiment the recording power Pw and the erasing power Pe were variable, it is also possible to determine the optimum recording conditions by making the pulse width variable while using the recommended recording power recorded on the disc as a fixed value. In this method of test write, the number of parameters is reduced as the laser power is a fixed value, so that the time required for the test write can be reduced and the area used for the test write can also be reduced.

An actual recording of user data is carried out using the recording waveform obtained as a result of the test write.

Embodiment 2

Figure 6:
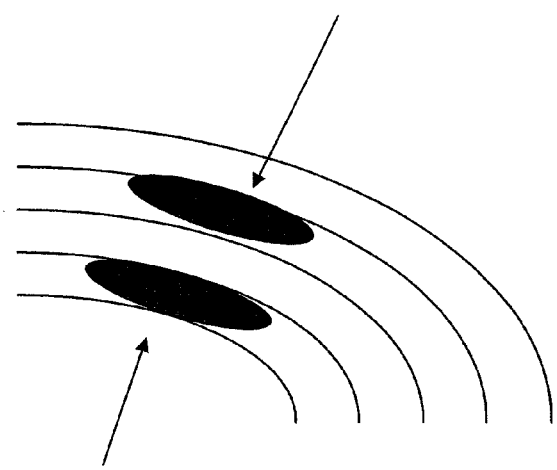
FIG. 6 shows an example of a test-write region used in the case where a test-write recording pattern for even-number length marks and that for odd-number length marks are used.

In Embodiment 1, the test-write recording pattern was divided into an even-number length mark expressed by nT=2LT and an odd-number length mark expressed by nT=(2L+1)T which were then individually recorded in order to obtain an optimum recording waveform. Namely, in Embodiment 1, as shown in FIG. 6, if one track is used for the test write for determining the optimum recording waveform for an even-number length mark, another one track is necessary for the test write for determining the optimum recording waveform for an odd-number length mark.

Figure 9:
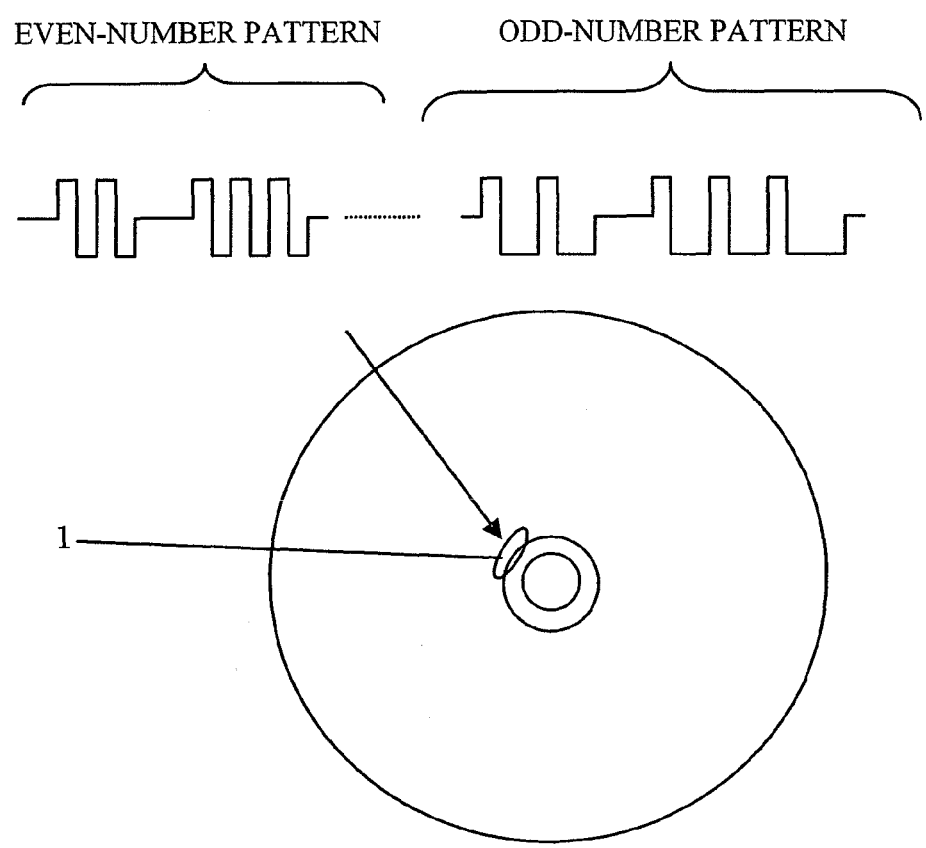
FIG. 9 shows an example of a test-write pattern used in the invention.

In the present embodiment, there are provided in a single test-write recording pattern a recording pattern region consisting only of even-number length marks and a recording pattern region consisting only of odd-number length marks (see FIG. 9, referenced by numeral 1). The reproduction characteristics of each pattern region are then measured in order to improve the efficiency of test write. Specifically, a recording pattern consisting of even-number length marks and a recording pattern consisting of odd-number length marks are continuously formed.

Figure 4:
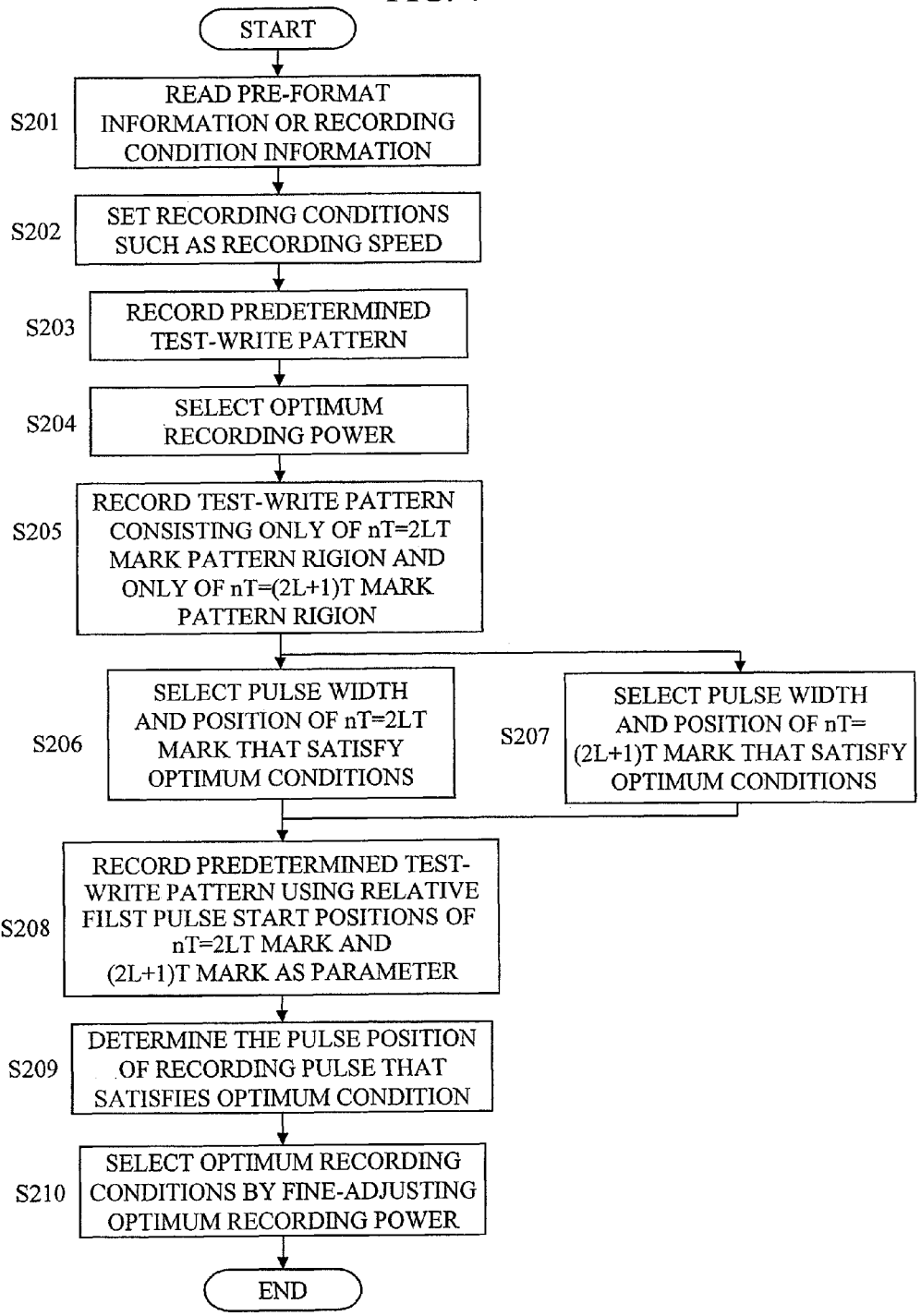
FIG. 4 shows a process flowchart of a test-write method according to an embodiment of the invention.

The disc used was a phase-change disc adapted for a blue light source capable of 6× speed recording. The linear velocity was about 31.7 m/s. FIG. 4 shows a flowchart of the operation of the test-write method according to the present embodiment. In a first step (S201), the recording conditions such as the recommended power were read from the disc, obtaining a recording power (Pw) of 18 mW, an erasing power (Pe) of 3.4 mW, and a bias power (Pb) of 0.25 mW. In a second step (S202), the laser power conditions were set in these vicinities, and then a test write was carried out on the disc in a third step (S203). The laser power conditions were such that Pw was varied between 16 mW and 20 mW in increments of 0.2 mW, and Pe was varied between 3.1 mW and 3.7 mW in increments of 0.2 mW, while fixing the value of Pb. As a result of the test write in the third step (S203), a minimum jitter of 4.5% was obtained when Pw was 18.2 mW and Pe was 3.2 mW, in a fourth step (S204).

Using the optimum recording power selected in the fourth step (S204), a recording was carried out in a fifth step (S205) in order to determine the optimum conditions for the recording pulse width of a recording mark and the start position of a recording pulse. In this case, there were provided in a single test-write recording pattern a recording pattern region consisting only of even-number length marks (nT=2LT) and a recording pattern region consisting only of odd-number length marks (nT=(2L+1)T). The reproduction signals from these recording pattern regions were individually measured and evaluated to determine the optimum recording pulse conditions for the even-number length marks and odd-number length marks individually. The pulse width was varied in increments of $1/16$T. As a result, a pulse width of 0.88T was obtained for the first pulse width of an even-number length mark, against a set value 0.81T. For the first pulse width of an odd-number length mark, a pulse width of 0.94T was obtained against a set value of 0.88T. While the first pulse widths have been described here, the last pulse width and the fall pulse width of a cooling level following the irradiation of the last pulse were also optimized.

Using the recording waveform of each recording mark that has been set with the pulse width and position of the recording pulse that satisfies the optimum conditions determined in the sixth and seventh steps (S206 and S207), a test write was carried out in an eight step (S208). Specifically, using as parameters the relative positions of the start position of the first pulse of the even-number length mark and that of the odd-number length mark as determined in S206 and S207, $\Delta$T shown in FIG. 2 was determined. As a result of the test write in the eighth step (S208), an optimum $\Delta$T of 0.1T and an optimum jitter of 5.0% were obtained in a ninth step (S209).

With regard to the mark formed by a single pulse, such as the 2T mark and the 3T mark, the recording pulse conditions including the first pulse position were independently set, as in Embodiment 1. This is due to the fact that since the 2T and 3T marks are made up of a single pulse, the process of determination of the front edge position is different from that of the other marks made up of a plurality of recording pulses. In the present embodiment, the recording pulse conditions for the 2T and 3T marks were obtained in step S208 of test write, as well as determining $\Delta$T in the ninth step (S209).

Finally, the optimum recording power determined in step S204 was finely adjusted in S210. While in step S204 the minimum jitter was obtained when Pw was 18.2 mW and Pe was 3.2 mW, in step 210, the minimum jitter was obtained when Pw was 18.5 mW. Pe was the same at 3.2 mW. Thus, the recording power is finely adjusted after it is determined and the recording pulse conditions are set using the recording power. In this way, more appropriate recording conditions can be determined.

In an actual recording, a recording waveform determined based on the test write is used.

Embodiment 3

In Embodiment 2, a recording pattern region consisting only of even-number length marks and a recording pattern region consisting only of odd-number length marks were provided in a single test-write recording pattern. In the present embodiment, a so-called random signal is used in the test-write recording pattern, the random signal consisting of a combination of all of the mark lengths and space lengths. Upon reproduction, the random signal is read separately for the even-number lengths and odd-number lengths and the optimum recording conditions are determined for the even-number length marks and the odd-number length marks. In this method, the reproduction characteristics are measured from a single recording pattern separately for the even-number lengths and odd-number lengths, so that there is no need to prepare a special test-write recording pattern. Therefore, a smaller number of changes are required to be made in the existing system. Further, as compared with the test-write method employing recording patterns separately for even and odd numbers, the time and region required for a test write can be reduced.

Figure 11:
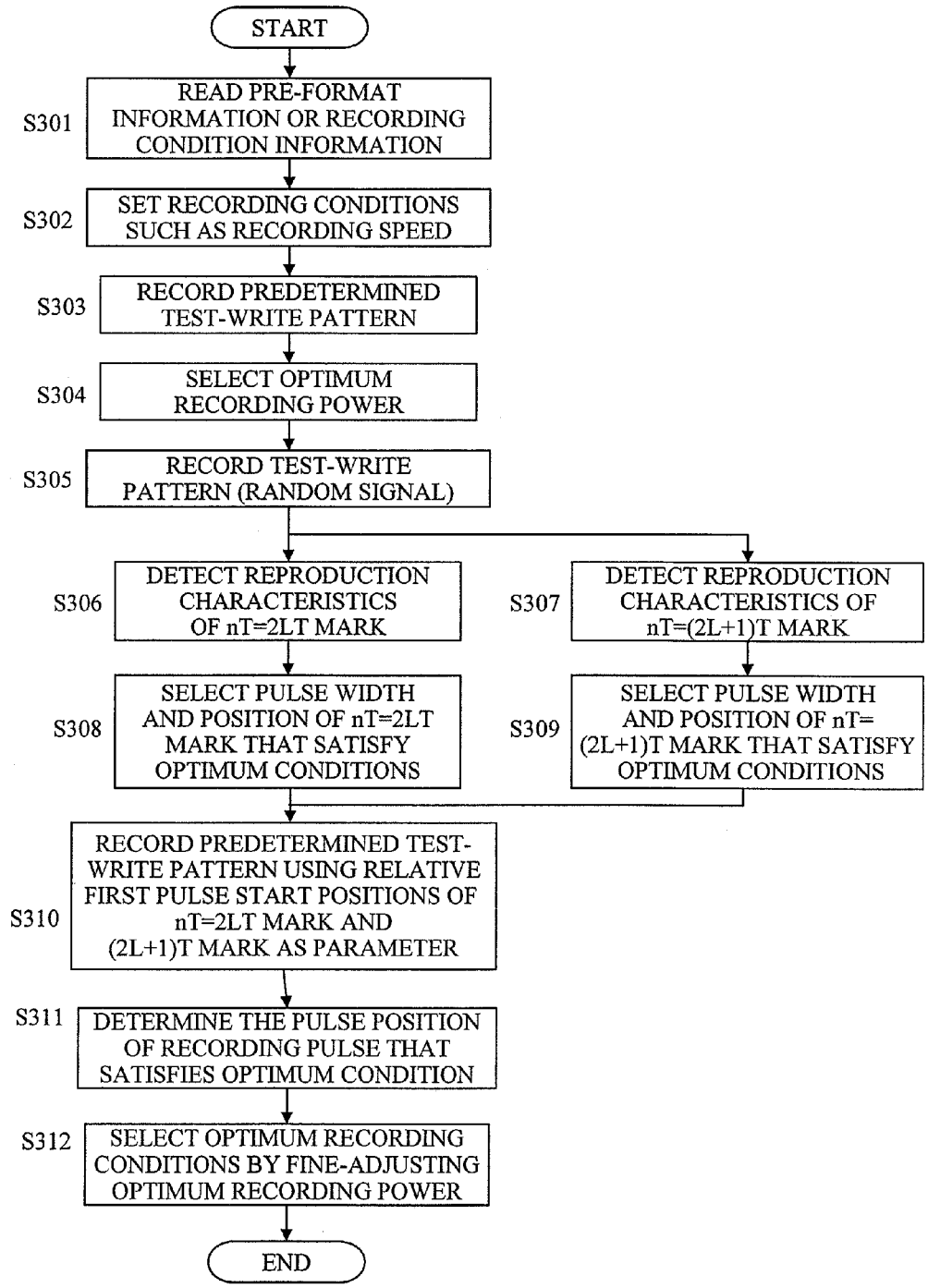
FIG. 11 shows a process flowchart of a test-write method according to an embodiment of the invention.

The disc used in the present embodiment was the same as that of Embodiment 2. The linear velocity was also the same at about 31.7 m/s. FIG. 11 shows a flowchart of the operation of the test write method according to the present embodiment. The first (S301) through the fourth (S304) steps are the same as those of Embodiment 2 (S201 to S204) and are therefore not described herein for simplicity.

Using the optimum recording power (Pw 18.2 mW, Pe 3.2 mW) selected in the fourth step (S304), a recording was carried out in order to determine the optimum conditions regarding the recording pulse width of a recording mark and the start position of a recording pulse. In the present embodiment, a random signal was used as the test-write recording pattern. In sixth and seventh steps (S306 and S307), the reproduction signal of even-number length marks and that of odd-number length marks that were randomly arranged were simultaneously measured. The signals were then evaluated separately for even-number lengths and odd-number lengths. In eighth and ninths steps (S308 and S309), the optimum recording pulse conditions for the even-number length marks and odd-number length marks were separately determined.

Using the recording waveform of each recording mark that has been set with the pulse width and position of the recording pulse that satisfies the optimum conditions determined in the eighth and ninth steps, a test write was carried out in a tenth step (S310). Specifically, using as parameters the relative positions of the start position of the first pulse of the even-number length mark and that of the odd-number length mark as determined in S308 and S309, $\Delta$T shown in FIG. 2 was determined. As a result of the test write in the tenth step (S310), an optimum $\Delta$T of 0.1T and an optimum jitter of 5.1% were obtained in an eleventh step (S311), which were comparable to those of Embodiment 2.

The marks formed by a single pulse, such as the 2T mark and the 3T mark, were handled in the same manner as in Embodiment 2. As a result of fine adjustment of the optimum recording power (S312), Pw of 18.5 mW and Pe of 3.2 mW, which are the same as those of Embodiment 2, were obtained.

The above-described method is effective not just with optical discs with a single recording film layer but particularly as a test write method for optical discs of the type that has a plurality of recording film layers. In the case of a BD-RE 4× speed-adapted optical disc with two recording layers, the recording margin in each recording layer is narrowed by 2 to 5 points as compared with the recording margin of a single-layer 4× speed BD-RE disc. However, by setting the recording power Pw and the erasing power Pe individually or making the pulse width variable in accordance with the invention, in addition to the control of the laser power, the recording margin can be expanded to the same degree as that of the single-layer BD.

Embodiment 4

In Embodiment 2, because of the use of the 2T-based strategy, the test-write recording pattern was divided into even-number length marks and odd-number length marks. In the present embodiment, a 3T-based strategy is employed.

Figure 5:
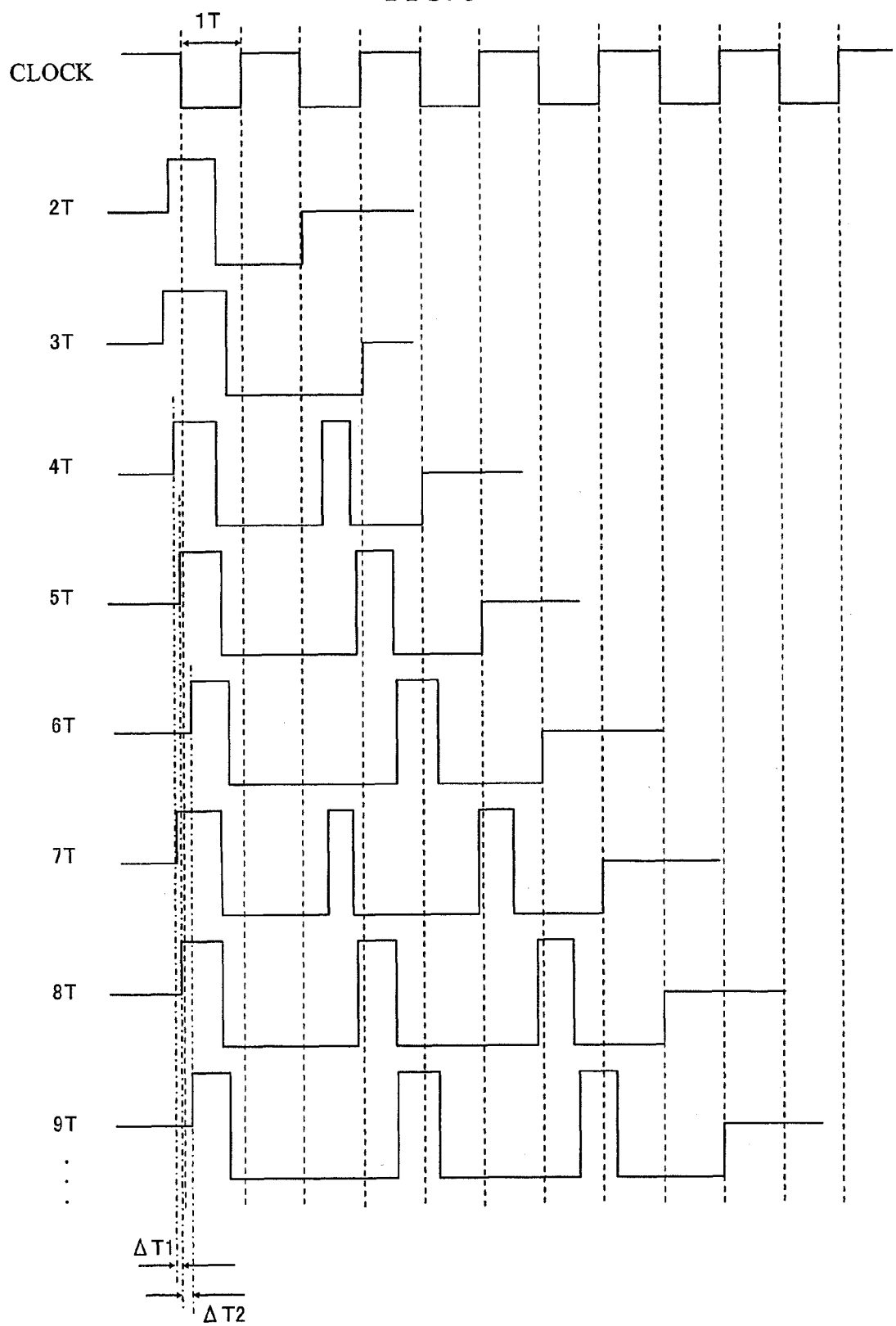
FIG. 5 shows an example of a recording pulse waveform used in the invention.

The 3T-based strategy involves a recording system in which the number of recording pulses expressed by nT=3LT, nT=(3L−2)T, and nT=(3L−1)T is the same. For example, 4T to 6T marks are made up of two recording pulses, and 7T to 9T marks are made up of three recording pulses. FIG. 5 shows the 3T-based strategy.

In the present embodiment, using the disc used in Embodiment 2 and a tester, three kinds of test-write recording patterns were recorded which consisted of mark lengths expressed by multiples of 3, mark lengths expressed by multiples of 3 from which 1 was subtracted, and mark lengths expressed by multiples of 3 from which 2 was subtracted. Specifically, a test-write pattern for an nT=3LT mark consisted of two kinds of marks, namely 6T and 9T marks, and 12 kinds of lengths of spaces, namely 3T to 14T, that were randomly arranged. Similarly, a test-write pattern for an nT=(3L−1)T mark consisted of two kinds of marks, namely 5T and 8T marks, and 12 kinds of lengths of spaces 3T to 14T, that were randomly arranged. A test-write pattern for an nT=(3L−2)T mark consisted of two kinds of marks 4T and 7T and 12 kinds lengths of spaces 3T to 14T that were randomly arranged.

Each pulse width and pulse start position were then determined as in Embodiments 1 and 2. Thereafter, ΔT1 which is the difference in pulse start position between the nT=(3L−1)T mark and the nT=(3L−2)T mark shown in FIG. 5 (such as the distance between 4T and 5T, or between 7T and 8T) was determined as a parameter. Further, ΔT2 which is the difference in pulse start position between the nT=(3L−1)T mark and the nT=3LT mark (such as the distance between 5T and 6T, or between 8T and 9T), namely the relative first pulse positions of the nT=(3L−1)T mark and the nT=3LT mark, was determined as a parameter. As a result, 0.07T was obtained for both ΔT1 and ΔT2.

Embodiment 5

In the present embodiment, an example of a 4T-based strategy adapted for even higher speeds is described that uses a phase-change disc capable of 8× speed recording and adapted for a blue light source. The 4T-based strategy involves a system in which the number of recording pulses making up each of four adjoining mark lengths is the same. For example, the same number of recording pulses are used for the marks expressed by nT=4LT, nT=(4L−2)T, nT=(4L−1)T, and nT=(4L+1)T.

Figure 10:
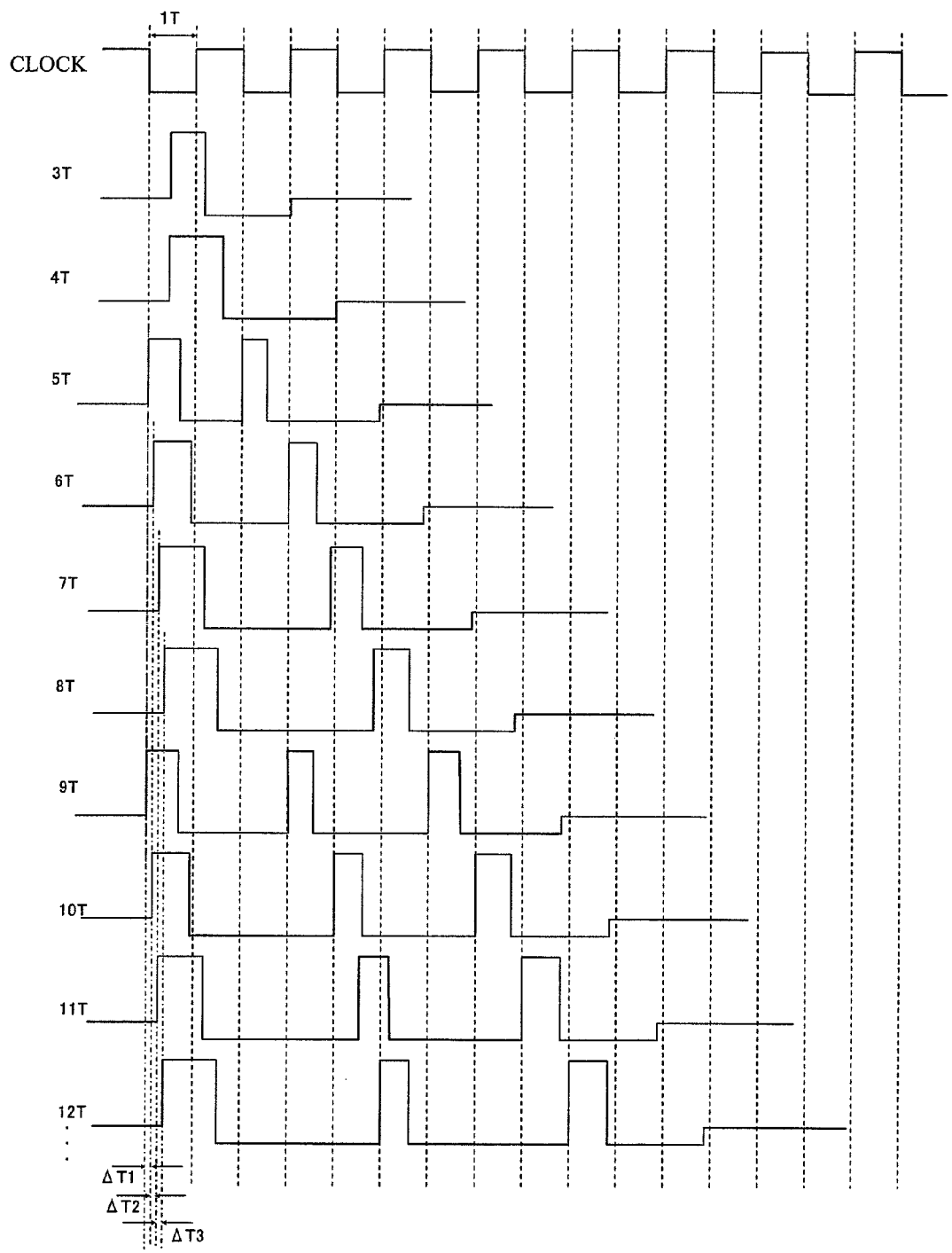
FIG. 10 shows an example of a recording pulse waveform used in the invention.

An example of such a test-write recording pattern is shown in FIG. 10. 5T to 8T marks are made up of two recording pulses, 9T to 12T marks are made up of three recording pulses, and 13T and 14T marks are made up of four recording pulses. Using this 4T-based strategy, a test-write recording was carried out. In the present embodiment, as in Embodiment 3 a random signal was used in which all of the mark and space lengths were combined in the test-write recording pattern. Upon reproduction, the random signal was read in four groups of patterns, and then the optimum recording conditions were determined for each of the four groups. Specifically, the aforementioned four groups of patterns are a group of 5, 9, and 13T marks, a group of 6, 10, and 14T marks, a group of 7 and 11T marks, and a group of 8 and 12T marks. The individual pulse width and pulse start position were then determined as in the above-described embodiments, and then the relative positions of the first pulse start positions of the four groups were adjusted. In the present embodiment, the recording pulses for the 3T mark and the 4T mark were independently set.

A test write was carried out in the same manner as in the above-described embodiments, and there were obtained parameters ΔT1 that is the difference in the pulse start position between the nT=(4L−2)T mark and the nT=(4L−1)T mark, ΔT2 that is the difference in the pulse start position between the nT=(4L−1)T mark and the nT=4LT mark, and ΔT3 that is the difference in the pulse start position between the nT=4LT mark and the nT=(4L+1)T mark, as shown in FIG. 10. As a result, ΔT1 and ΔT3 were 0.05T and ΔT2 was 0.061. With regard to the first pulse width, only the marks expressed by nT=(4L+1)T, namely the group of 5, 9, and 13T marks, had a different value from the set value, or shorter by 1/16T.

Embodiments 1 to 5 are particularly suitable for accurately obtaining the high-density and high transfer-rate recording conditions.

Embodiment 6

Figure 12:
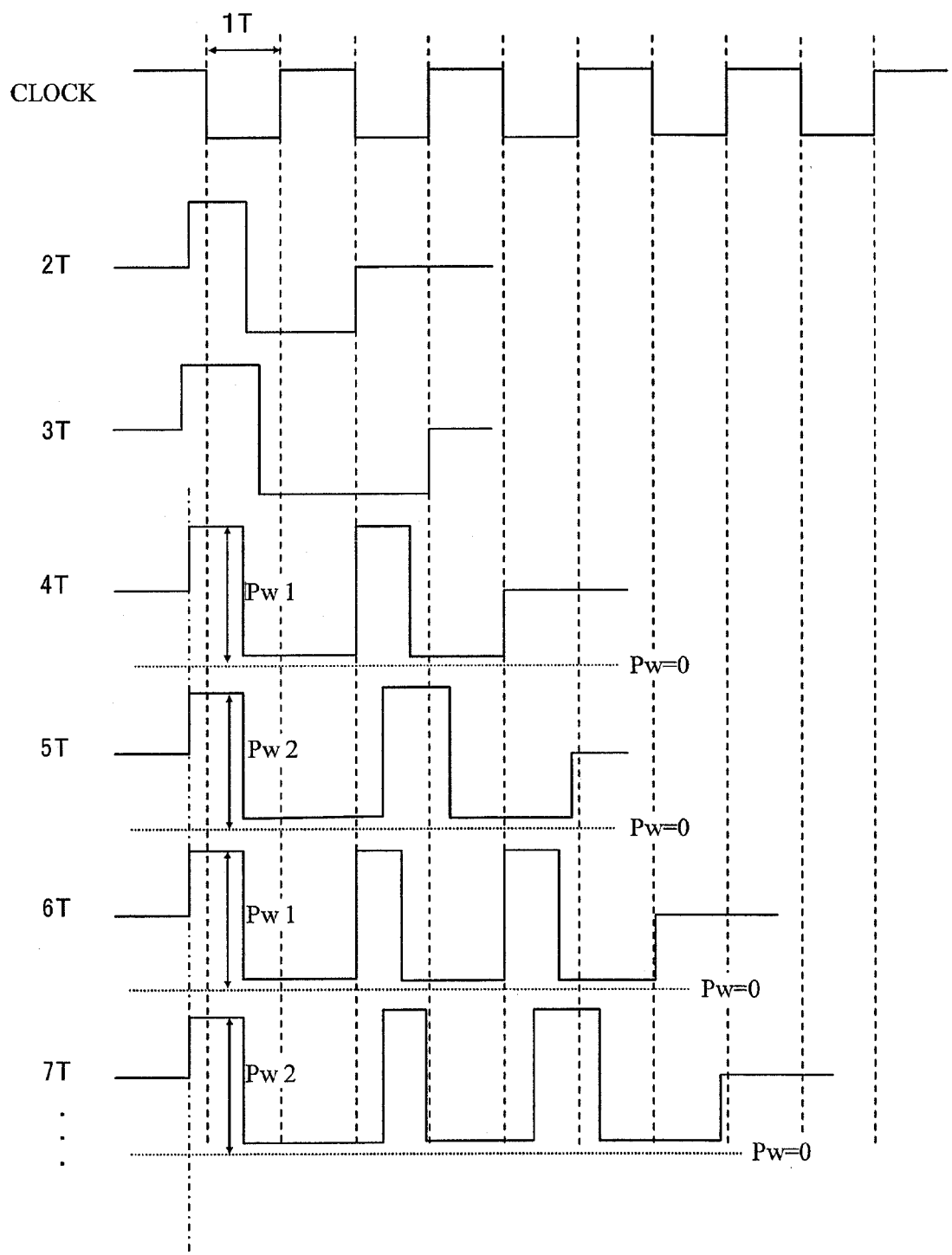
FIG. 12 shows an example of a recording pulse waveform used in the invention.

In Embodiments 1 to 5, the optimum recording pulse waveform was obtained by changing the recording pulse width and position. The present embodiment involves a test write method in which, using the disc used in Embodiment 2, the optimum recording waveform is obtained by changing the recording power while employing the same pulse start position for the even-number length marks and odd-number length marks. Specifically, as shown in FIG. 12, ΔT shown in FIG. 2 was considered zero, and such Pw1 and Pw2 were determined that the jitter could be minimized, where Pw1 is the recording power for the even-number length mark and Pw2 is the recording power for the odd-number length marks. As a result, the minimum jitter was obtained when Pw1 was 18.5 mW and Pw2 was 18.2 mW.

While in the present embodiment the recording power for the first pulse was varied, the recording power of intermediate pulses or that of the last pulse may also be varied. Although by individually setting the recording power for these pulses, the laser power level increases and the recording waveform could be more complicated, there can be obtained the advantage that an optimum recording condition can be obtained.

While the power level is varied in the present embodiment, it is also possible to vary the pulse width simultaneously in addition to the power level in order to determine optimum recording conditions, although this may make the embodiment more complicated.

Embodiment 7

In the present embodiment, the start positions of the first pulse for the even-number length mark and the odd-number length mark are aligned if certain conditions are satisfied in the 2T-based strategy.

Figure 13:
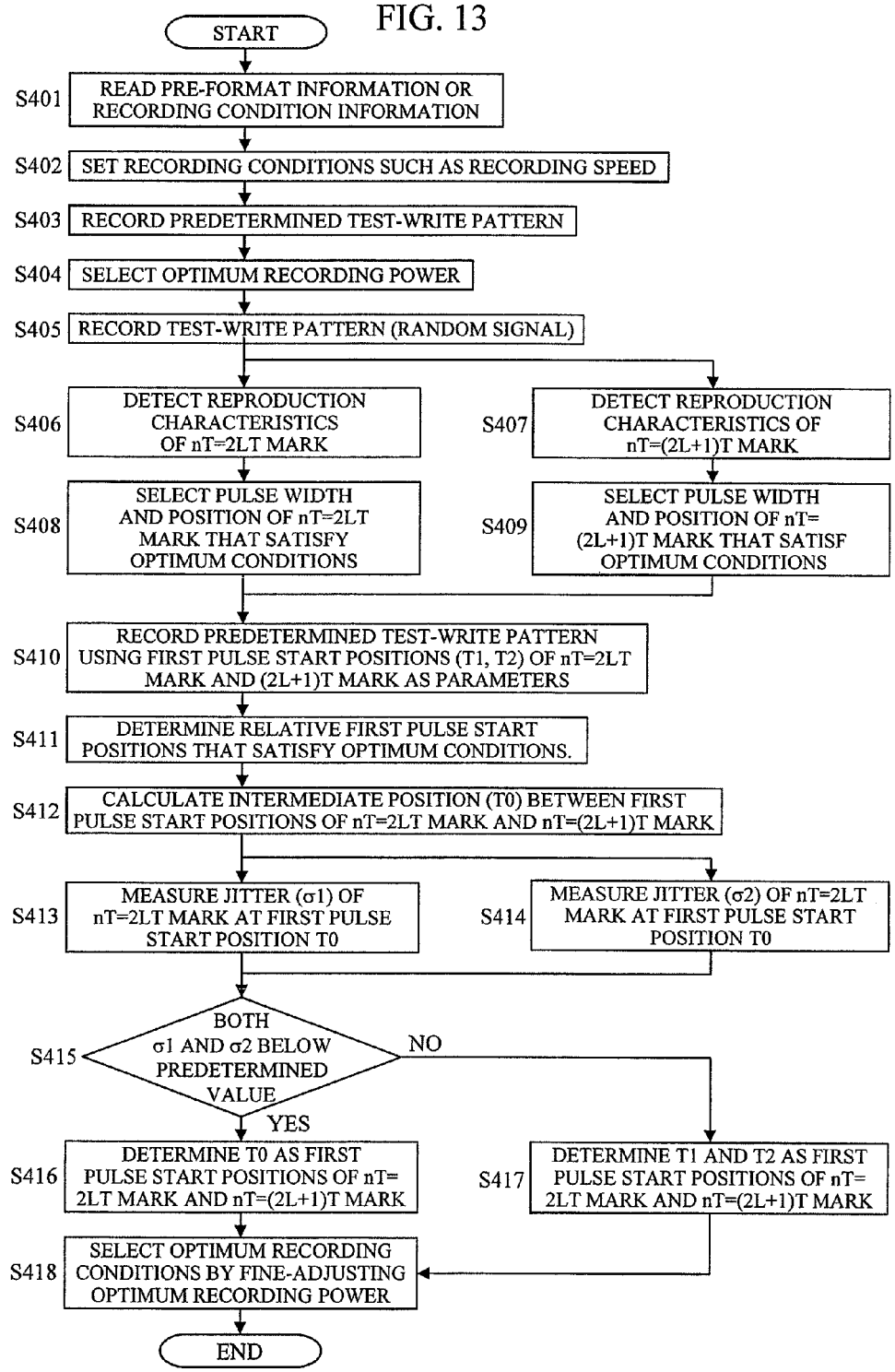
FIG. 13 shows a process flowchart of a test-write method according to an embodiment of the invention.

In the present embodiment, the same disc as the one used in Embodiment 2 was used, and the linear velocity was also the same as that in Embodiment 2 at about 31.7 m/s. FIG. 13 shows a flowchart of the operation of the test write method according to the present embodiment. In a first step (S401), the recommended recording power recorded on the disc was read, obtaining a recording power (Pw) of 18 mW, an erasing power (Pe) of 3.4 mW, and a bias power (Pb) of 0.25 mW. In a second step (S402), laser power conditions were set in these vicinities, and a test write was carried out on the disc in a third step (S403). The laser power conditions were such that Pw was varied between 16 mW and 20 mW in increments of 0.2 mW and Pe was varied between 3.1 mW and 3.7 mW in increments of 0.2 mW, with the value of Pb fixed. As a result of the test write in the third step (S403), a minimum jitter of 4.5% was obtained when Pw was 18.2 mW and Pe was 3.2 mW in a fourth step (S404). These steps are identical to those of Embodiment 2.

Using the optimum recording power selected in the fourth step (S404), a recording was then carried out in order to determine the optimum conditions for the recording pulse width of the recording mark and the recording pulse start position. In the present embodiment, a random signal was used as the test-write recording pattern, as in Embodiment 3. The flow from S406 to S411 is substantially the same as that of Embodiment 3 and is therefore not described for simplicity. As a result of the test write, an optimum ΔT (see FIG. 2) of 0.1T and an optimum jitter of 5.1% were obtained in an 11$^{th}$ step (S411).

Figure 7:
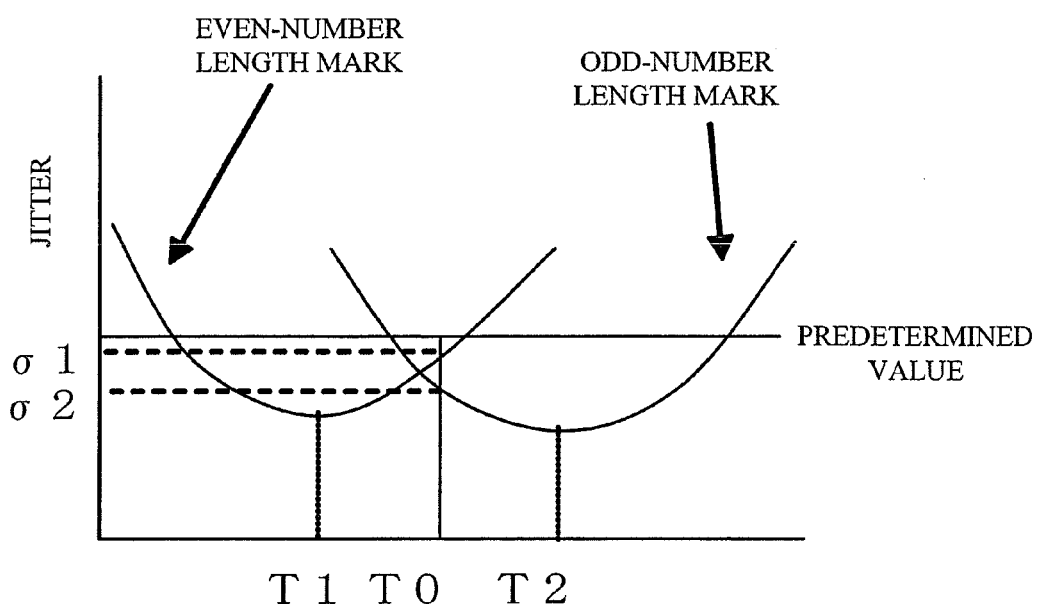
FIG. 7 shows an example of the relationship between a first pulse start position, an intermediate position, and jitter.

Then, in a 12$^{th}$ step (S412), a substantially intermediate position T0 between a first pulse start position T1 of an even-number length mark and a first pulse start position T2 of an odd-number length mark. FIG. 7 shows an example of the relationship between the first pulse start positions T1 and T2, the intermediate position T0, and the jitter. In the present embodiment, the predetermined value of jitter was 5.8%. Jitter σ1 when the first pulse start position of the even-number length mark was T0 was measured (S413). Similarly, jitter σ2 when the first pulse start position of the odd-number length mark was T0 was measured (S414). It was then determined in step 415 whether or not σ1 and σ2 are smaller than the predetermined value. Since σ1 was 5.7% and σ2 was 5.3% in the present embodiment, which were below the predetermined value, the first pulse start position for the even-number length mark and the odd-number length mark was determined to be T0. By thus aligning the first pulse start position for the even-number length mark and the odd-number length mark, although the reproduction characteristics are somewhat adversely affected, the recording waveform can be simplified and higher speeds can be achieved in an actual recording.

While in the present embodiment the first pulse start position was used as the parameter for determining the intermediate point, the recording power may alternatively be used as the parameter as in Embodiment 6. In this case, an intermediate power (Pw1+Pw2)/2 between Pw1 and Pw2 indicated in Embodiment 6 would be the set power.

Further, while jitter was used in the above embodiment as the characteristics evaluation means, a level jitter that is applied in PRML may alternatively be used.

Embodiment 8

Figure 8:
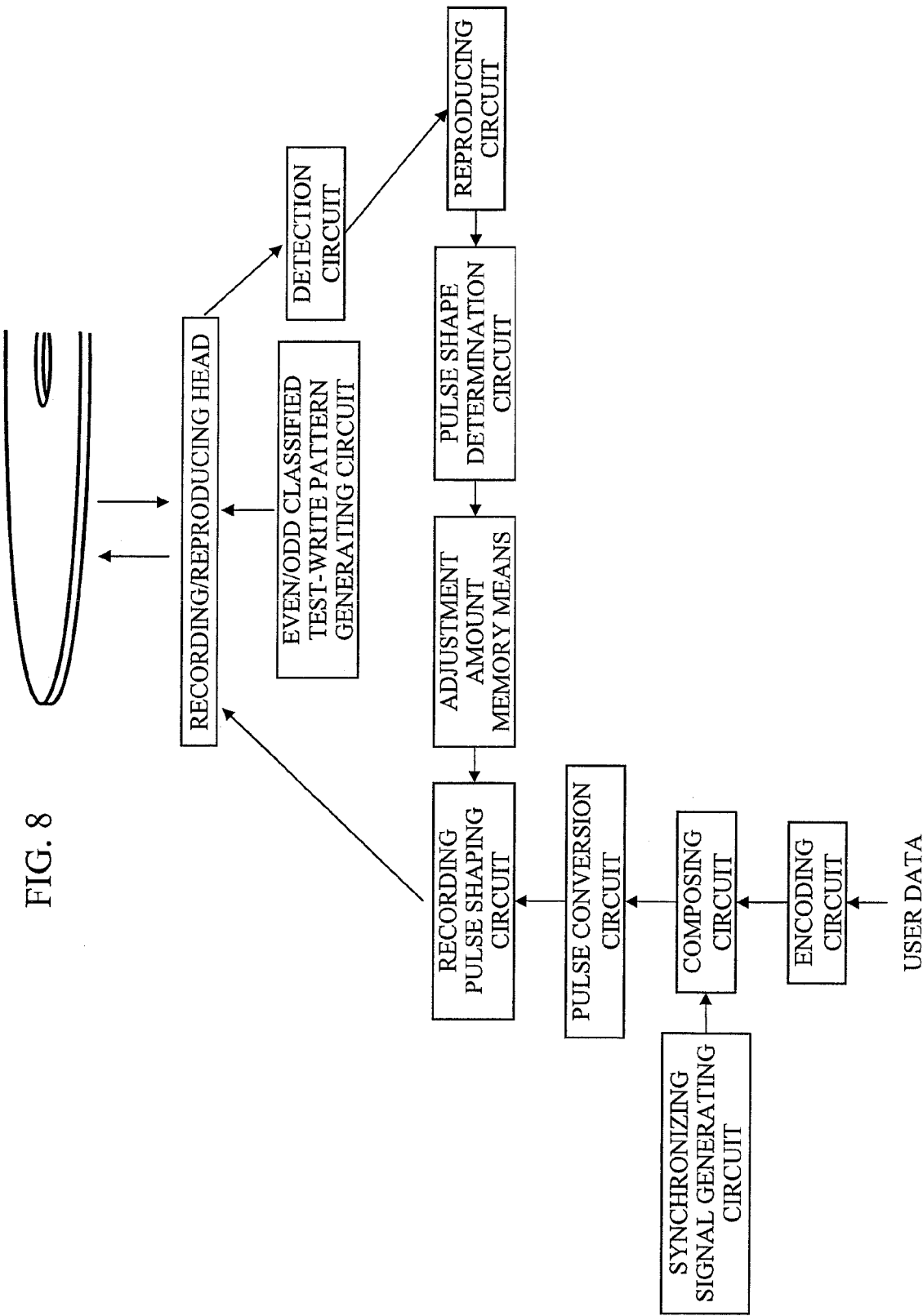
FIG. 8 shows an example of an apparatus used in the invention.
Figure 14:
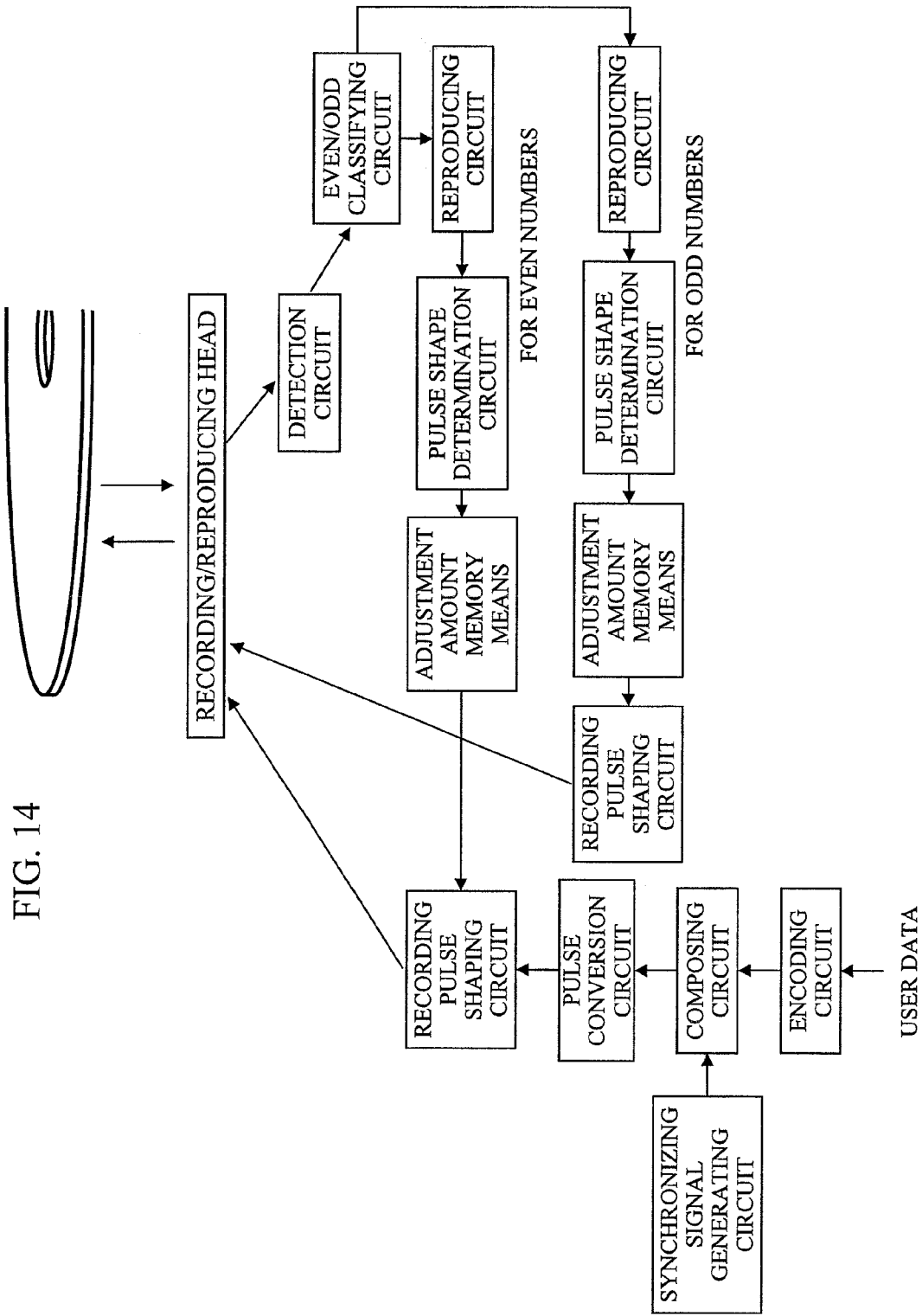
FIG. 14 shows an example of an apparatus used in the invention.

The present embodiment involves an apparatus for carrying out the test write according to the above-described embodiments and an actual recording. The apparatus is of a 2T-based strategy such as that of Embodiment 2, for example. The apparatus is generally shown in FIGS. 8 and 14. Recording data is converted into recording code words in an encoding circuit and then composed with a synchronizing signal generated in a synchronizing signal generating circuit. The composed signal is entered into a pulse conversion circuit where it is converted into pulse data, which is further shaped into pulses in a recording pulse shaping circuit for driving a light source. The processes up to this point are identical in both FIGS. 8 and 14.

The even-number length marks and odd-number length marks are classified in order to produce a recording pattern. The apparatus shown in FIG. 8 is equipped with an even/odd classified test-write pattern generating circuit. The even/odd classified test-write pattern generating circuit generates a test-write recording pattern consisting of even-number length marks and a test-write recording pattern consisting of odd-number length marks, and then records them on the disc. The signals recorded on the disc are detected by a detection circuit, and the reproduction performance is evaluated by a reproducing circuit. The next pulse waveform is determined by a pulse waveform determining circuit, and the path returns to the recoding pulse shaping circuit via an adjustment amount memory means. In the pulse waveform determining circuit, pulse shapes such as the duty ratio of an intermediate pulse, the first pulse width, the last pulse width, the fall pulse width of a cooling level after the irradiation of the last pulse, individual recording power values, and the first pulse start position, for example, can be changed. While an even/odd classified test-write pattern generating circuit was described with reference to FIG. 8, any test-write pattern generating circuit may be used as long as it is capable of classifying the marks with lengths that are n times the window margin, where n is a natural number, according to the remainder when n is divided by an integer constant of 2 or more.

FIG. 14 shows an example of the apparatus in which a random signal is used instead of using individual test-write recording patterns for even-number lengths and odd-number lengths. The random signal recorded in a test write is detected by a detection circuit and then classified into even-number length marks and odd-number length marks in an even/odd classifying circuit. The apparatus shown in FIG. 14 is characteristically equipped with a reproduction circuit, a pulse waveform determining circuit, an adjustment amount memory circuit, and a recording pulse shaping circuit for the even-number length marks and the odd-number length marks individually. These circuits can be easily realized on a single circuit, and it is also easy to increase the number of each circuit to more than one. While in the example of FIG. 14 an even/odd classifying circuit was described, any classifying circuit may be used as long as it is capable of classifying the marks with lengths that are n times the window margin, where n is a natural number, according to the remainder when n is divided by an integer constant of 2 or more.

What is claimed is:

1. An information recording method for recording recording codes on an information recording medium using a predetermined write strategy, the method comprising:

recording a random signal on the information recording medium, the random signal consisting of a plurality of randomly arranged odd-number length marks and even-number length marks;

classifying read signals of the random signal into read signals corresponding to the odd-number length marks and read signals corresponding to the even-number length marks; and independently setting position conditions of recording pulses for the odd-number length marks and position conditions of recording pulses for the even-number length marks that constitute the write strategy based on the classified read signals.

2. The information recording method according to claim 1, wherein position conditions of recording pulses used for recording odd-number length marks among the recording pulses that constitute the write strategy are set using the read signals corresponding to the odd-number length marks, and position conditions of recording pulses used for recording even-number length marks among the recording pulses that constitute the write strategy are set using the read signals corresponding to the even-number length marks.

3. The information recording method according to claim 2, further comprising:

further adjusting the previously set start positions of irradiating first pulses of the recording pulses used for recording the even-number length marks and the previously set start positions of irradiating first pulses of the recording pulses used for recording the odd-number length marks.

4. The information recording method according to claim 1, wherein an nT-based write strategy is used as the write strategy, where n is a natural number and T is a reference clock period, the read signals of the random signal are classified according to mark lengths of marks represented by the product obtained by multiplying the remainder of the n divided by an integer, which is not less than 2, and the T, and position conditions of recording pulses used for recording marks with mark lengths, which are represented by the product of the remainder and the T, are set based on the classified read signals.

5. The information recording method according to claim 4, wherein a 3T-based write strategy or a 4T-based write strategy is used as the nT-based write strategy.

6. A trial write method for setting a recording condition for the recording of recording codes on an information recording medium using a predetermined write strategy, the method comprising:

recording a random signal on the information recording medium, the random signal consisting of plurality of randomly arranged odd-number length marks and even-number length marks;

classifying read signals of the random signal into read signals corresponding to the odd-number length marks and read signals corresponding to the even-number length marks; and independently setting position conditions of recording pulses for the odd-number length marks and position conditions of recording pulses for the even-number length marks that constitute the write strategy based on the classified read signals.

* * * * *

UNITED STATES PATENT AND TRADEMARK OFFICE
CERTIFICATE OF CORRECTION

| | | |
|---|---|---|
| PATENT NO. | : 8,085,638 B2 | Page 1 of 1 |
| APPLICATION NO. | : 12/831094 | |
| DATED | : December 27, 2011 | |
| INVENTOR(S) | : Ushiyama et al. | |

It is certified that error appears in the above-identified patent and that said Letters Patent is hereby corrected as shown below:

Please add the following items to the front of the patent:

(63) Related U.S. Application Data

Continuation of application No. 10/931,040, filed on Sep. 1, 2004, now Pat. No. 7,751,293

Signed and Sealed this
Twenty-ninth Day of May, 2012

David J. Kappos
*Director of the United States Patent and Trademark Office*

UNITED STATES PATENT AND TRADEMARK OFFICE
CERTIFICATE OF CORRECTION

PATENT NO. : 8,085,638 B2  
APPLICATION NO. : 12/831094  
DATED : December 27, 2011  
INVENTOR(S) : Ushiyama et al.

Page 1 of 1

It is certified that error appears in the above-identified patent and that said Letters Patent is hereby corrected as shown below:

Please add the following Items to the front of the patent:

(30) Foreign Application Priority Data

Jul. 30, 2004 (JP) 2004-222742

Signed and Sealed this
Sixth Day of November, 2012

David J. Kappos
*Director of the United States Patent and Trademark Office*